(12) United States Patent
Kitano et al.

(10) Patent No.: US 8,764,982 B2
(45) Date of Patent: Jul. 1, 2014

(54) MEMBRANE SEPARATION DEVICE (75) Inventors: Tomokazu Kitano, Amagasaki (JP);
Hidetoshi Masutani, Amagasaki (JP);
Yasunobu Okajima, Amagasaki (JP)

(73) Assignee: Kubota Corporation, Osaka-shi, Osaka (JP)

( * ) Notice: Subject to any disclaimer, the term of this patent is extended or adjusted under 35 U.S.C. 154(b) by 219 days.

(21) Appl. No.: 13/201,422

(22) PCT Filed: Mar. 30, 2010

(86) PCT No.: PCT/JP2010/055645
§ 371 (c)(1),
(2), (4) Date: Aug. 12, 2011

(87) PCT Pub. No.: WO2010/113924
PCT Pub. Date: Oct. 7, 2010

(65) Prior Publication Data
US 2011/0290710 A1  Dec. 1, 2011

(30) Foreign Application Priority Data
Mar. 31, 2009  (JP) ................................ 2009-083843

(51) Int. Cl.
*B01D 63/08* (2006.01)
(52) U.S. Cl.
CPC .......... *B01D 63/082* (2013.01); *B01D 2315/06* (2013.01); *B01D 2319/04* (2013.01); *B01D 2313/06* (2013.01)
USPC ... 210/321.75; 210/232; 210/340; 210/433.1; 210/450; 210/451; 210/453
(58) Field of Classification Search
CPC ............. B01D 63/082; B01D 2313/21; B01D 2313/04; B01D 2313/143; B01D 2319/04; B01D 5/0072; B01D 2313/06; B01D 2313/14; B01D 2313/146; B01D 69/06; B01D 2315/06
USPC ........... 210/232, 321.6, 321.75, 321.84, 340, 210/341, 433.1, 450, 451, 453
See application file for complete search history.

(56) References Cited

U.S. PATENT DOCUMENTS

2004/0211551 A1  10/2004  Shimura et al.

FOREIGN PATENT DOCUMENTS

| DE | 19807769 | 8/1999 |
|---|---|---|
| JP | 6-277462 | 10/1994 |
| JP | 7-68137 | 3/1995 |
| JP | 7-88338 | 4/1995 |

(Continued)

OTHER PUBLICATIONS

Search Report dated May 25, 2010 for International Application No. PCT/JP2010/055645.

(Continued)

*Primary Examiner* — John Kim
(74) *Attorney, Agent, or Firm* — Beyer Law Group LLP (57) ABSTRACT

Disclosed is a membrane separation device comprising a plurality of flat membrane elements (52) arranged in parallel to one another so as to form channels for a solution to be treated therebetween, and a collecting case (59) having a collecting space that is formed internally and communicates with filtrate flow channels of the membrane elements (52). The collecting case (59) includes a membrane element holder (53) having a plurality of slits, into which the sides of respective membrane elements (52) are inserted, and a stopper (58) which abuts on the membrane element holder (53) in the collecting case (59), and a filler (55) is provided in the slits to attach and watertightly seal between the membrane elements (52) and the membrane element holder (53).

6 Claims, 12 Drawing Sheets

(56) References Cited

FOREIGN PATENT DOCUMENTS

| JP | 7-100339 | 4/1995 |
| JP | 8-10587 | 1/1996 |
| JP | 8-89765 | 4/1996 |
| JP | 2001-170455 | 6/2001 |
| JP | 2008-246371 | 10/2008 |
| WO | WO 2010/015374 | 2/2010 |

OTHER PUBLICATIONS

Search Report dated Sep. 30, 2013 from European Application No. 10758695.

Prior Art

MEMBRANE SEPARATION DEVICE

TECHNICAL FIELD

The present invention relates to a membrane separation device that is used for filtration or condensation in treating general water, such as water, wastewater, and the like. The present invention specifically relates to a mechanism for holding a membrane module.

BACKGROUND TECHNOLOGY

Figure 20:
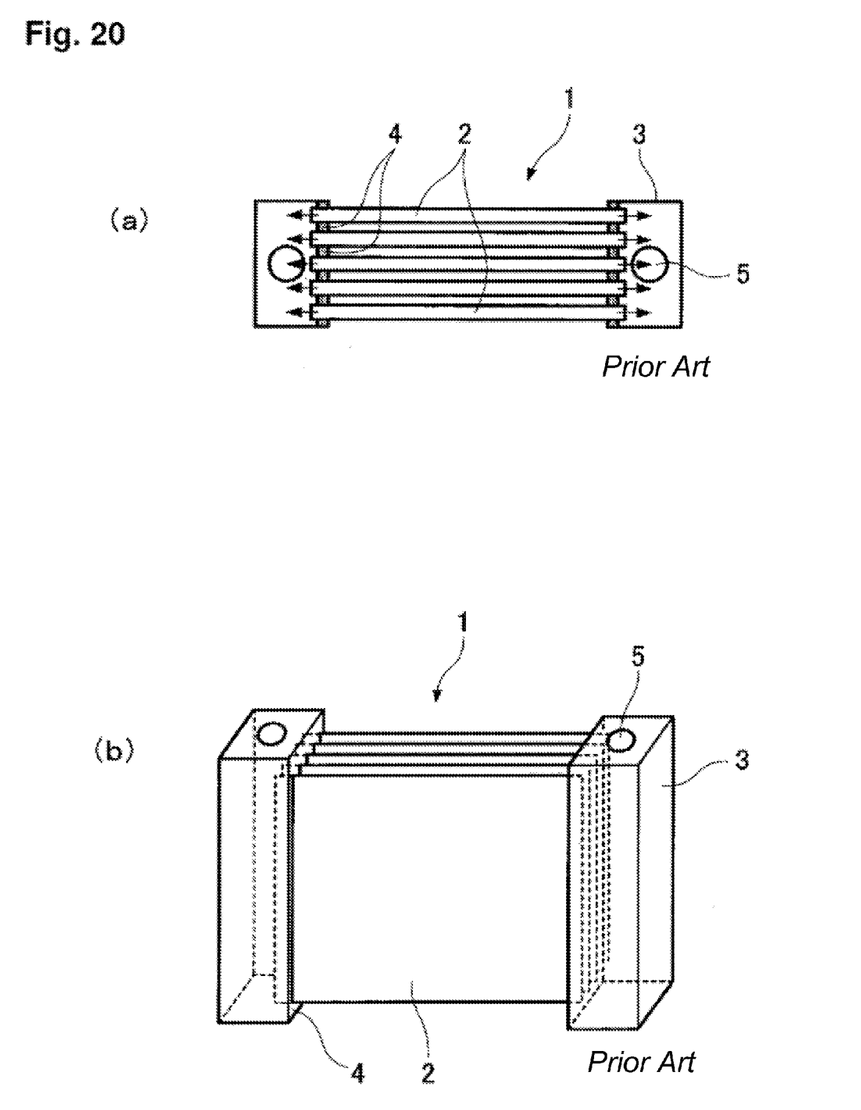

Conventionally known membrane separation devices include, for example, a technology shown in FIG. 20. In the technology, a membrane module 1 includes a plurality of membrane elements 2 arranged in parallel to one another and having a predetermined distance therebetween, a flow channel for water to be treated formed in a longitudinal direction thorough the membrane elements 2, and collecting cases 3 provided on both sides of the membrane elements 2. Each of the collecting cases 3 is provided, inside thereof, with a hollow space for collecting water, and filtrate passed through each membrane element 2 is collected in the water collecting space. A resin 4 is filled between the membrane elements 2 being adjacent to one another, and between the membrane elements 2 and the collecting cases 3. The plurality of membrane elements 2 are integrated and attached to the collecting cases 3 with watertight sealing by use of the resin 4. The filtrate collected in the collecting cases 3 is vacuum-discharged outside through discharge outlets 5 provided on the upper end surfaces of the collecting cases 3.

A technology disclosed in Japanese Patent Laid-open Publication No. 11-33370 includes a plurality of filtration membrane bodies that are provided in parallel to one another and integrated at both sides thereof, and a filtrate collecting portion that is provided at each of the integrated sides of the filtration membrane bodies and communicating with the inside of each filtration membrane body. Each filtration membrane body has two flat membranes laminated with a spacer therebetween. Two ends of one flat membrane are attached and sealed to two ends of the other flat membrane.

Another technology is disclosed in Japanese Patent No. 32932159, in which a plurality of unit modules are arranged with a predetermined distance therebetween, and left and right sides of each unit module are fixed to a housing. Each unit module is configured with a membrane provided at both sides of a spacer. Upper and bottom edges of the unit module are fixed and sealed with an adhesive. A connecting portion between the unit modules and the housing are also fixed and sealed with a sealer or a filler. Thereby, an unfiltered liquid is prevented from entering a filtrate chamber and a collecting chamber.

SUMMARY OF THE INVENTION

Shortcomings Resolved by the Invention

In the above-described membrane separation device, a pressure in the collecting space of the collecting case 3 at the time of a filtration operation is lower than a pressure of surrounding water, thus a force is applied to a layer of the resin 4 in a direction from outside to inside of the water collecting cases 3. In performing a vacuum filtration in particular, a vacuum is applied to the resin 4, thus the resin 4 is pulled to the internal side of the collecting case 3. Consequently, in some cases, the membrane elements 2 shift as the layer of the resin 4 shifts. This may result in distortion and thus breakage of the membrane modules. A liquid may leak from bonded surfaces between the membrane elements 2 and the resin 4, or between the collecting cases 3 and the resin 4. Further, it is difficult to keep a constant distance among the membranes of the membrane elements 2.

To address the circumstances above, one object of the present invention is to provide a membrane separation device capable of preventing shifting of a membrane element and distortion of a membrane module due to a pressure difference between the inside and the outside of a collecting case.

Means for Resolving the Shortcomings

To address the circumstances described above, a membrane separation device of the present invention includes a plurality of flat type membrane elements that are arranged in parallel to one another and form flow channels for a solution to be treated therebetween; and a collecting case that internally houses a collecting space communicating with filtrate flow channels of the membrane elements. The collecting case includes a membrane element holder that has a plurality of silts that hold sides of each membrane elements; and a stopper that abuts, inside the collecting case, on at least one of side end surfaces of the membrane elements and the membrane element holder.

A membrane separation device of the present invention includes a plurality of flat type membrane elements that are arranged in parallel to one another and form flow channels for a solution to be treated therebetween; a filler that attaches and watertightly seals sides of the membrane elements to one another so as to integrate the plurality of membrane elements as a whole; a collecting case that integrally holds the sides of the plurality of membrane elements through the filler, and internally houses a colleting space communicating with the filtrate flow channels of the membrane elements; and a stopper that abuts, inside the collecting case, on side end surfaces of the membrane elements.

Effects of the Invention

As described above, according to the present invention, with a stopper being provided inside a collecting case so as to abut on either a membrane element holder or membrane elements, it is possible to prevent the membrane element holder, the membrane elements, and the filler from shifting, to prevent the membrane module from being distorted and damaged, and to keep a constant distance among membrane elements, even when the membrane element holder or the filler receives a force caused by a pressure difference between inside and outside of a collecting case. Further, fluid leaks can be prevented from occurring between the membrane elements and the filler, or between the membrane element holder and the collecting case.

BRIEF DESCRIPTION OF THE DRAWINGS

FIG. 1 A membrane module according to an embodiment of the present invention is shown. (a) is a plan view, and (b) is a cross-sectional view along line A-A of (a).

FIG. 8 A membrane module according to another embodiment of the present invention is shown. (a) is a plan view, and (b) is a cross-sectional view along line B-B of (a).

FIG. 11 A membrane module according to another embodiment of the present invention is shown. (a) is a plan view, and (b) is a cross-sectional view along line C-C of (a).

FIG. 16 A membrane module according to another embodiment of the present invention is shown. (a) is a plan view, and (b) is a cross-sectional view along line D-D of (a).

FIG. 20 A conventional membrane module is shown. (a) is a plan view, and (b) is a perspective view.

EMBODIMENTS OF THE INVENTION

First Embodiment

Hereinafter, embodiments of the present invention will be explained with reference to the accompanying drawings. In FIGS. 1 to 7, a membrane separation device is configured with a membrane module 51 including a plurality of membrane elements 52 arranged in parallel to one another with a predetermined distance therebetween so as to form flow channels for water to be treated in a longitudinal direction through membrane elements 52.

Figure 6:
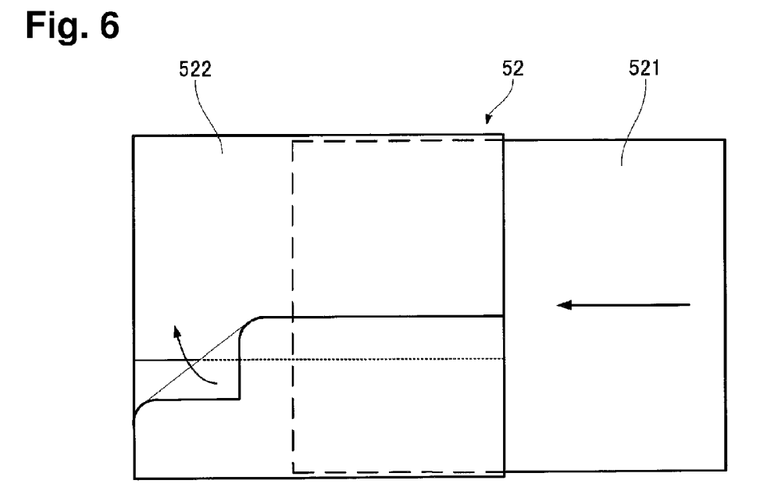
FIG. 6 A schematic view showing a membrane element according to the embodiment.
Figure 7:
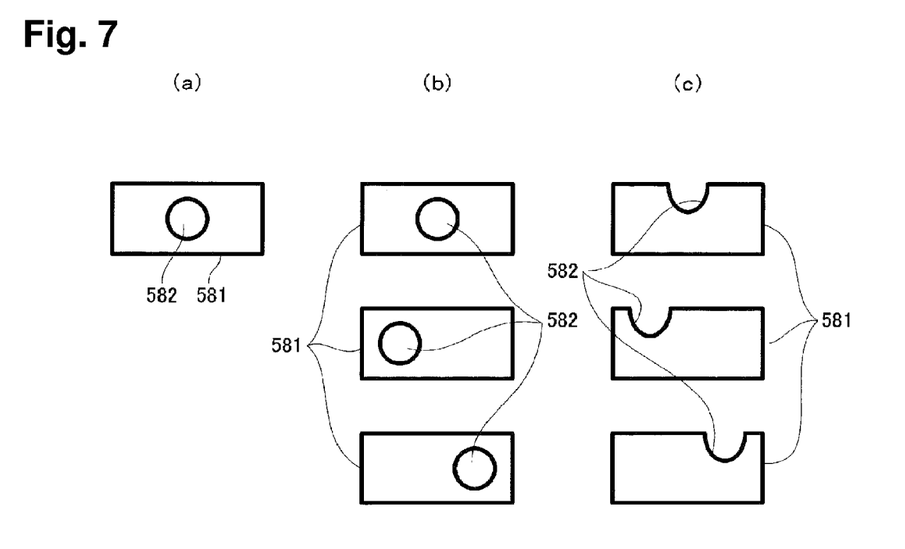
FIG. 7 A schematic view showing stoppers according to the embodiment.

As shown in FIG. 6, each membrane element 52 has a filtration plate 521 that acts as a membrane supporting body and is made of a resin, and a filtration membrane 522 that is configured with a flat membrane (organic membrane) provided so as to cover front and back main surfaces of the filtration plate 521. Filtrate flow channels are formed between the front and back main surfaces of the filtration plate 521 and the filtration membrane 522.

In this embodiment, the filtration membrane 522 is configured with one membrane sheet shaped into a loop. It is also possible to configure the filtration membrane 522 with a plurality of membrane sheets shaped into a loop, or a seamless loop-shaped membrane sheet. Alternatively, it is also possible to form the membrane element 52 by providing one membrane sheet to each of the front and back sides of the membrane supporting body and connecting the peripheral edges of the membrane sheets to the membrane supporting body. The membrane supporting body is not limited to the filtration plate 521 made of a resin, and the filtration plate 521 made of a flexible material such as a nonwoven fabric, a net, or the like may be used. Further, the configuration of the membrane element 52 is not limited to the one in which filtrate flow channels are formed between the front and back main surfaces of the filtration plate 521 and the filtration membrane 522. Alternatively, the filtration plate 521 may have a hollow space to be a filtrate flow channel, and a flow section that communicates with the hollow space may be provided to the front and back main surfaces of the filtration plate 521.

Figure 5:
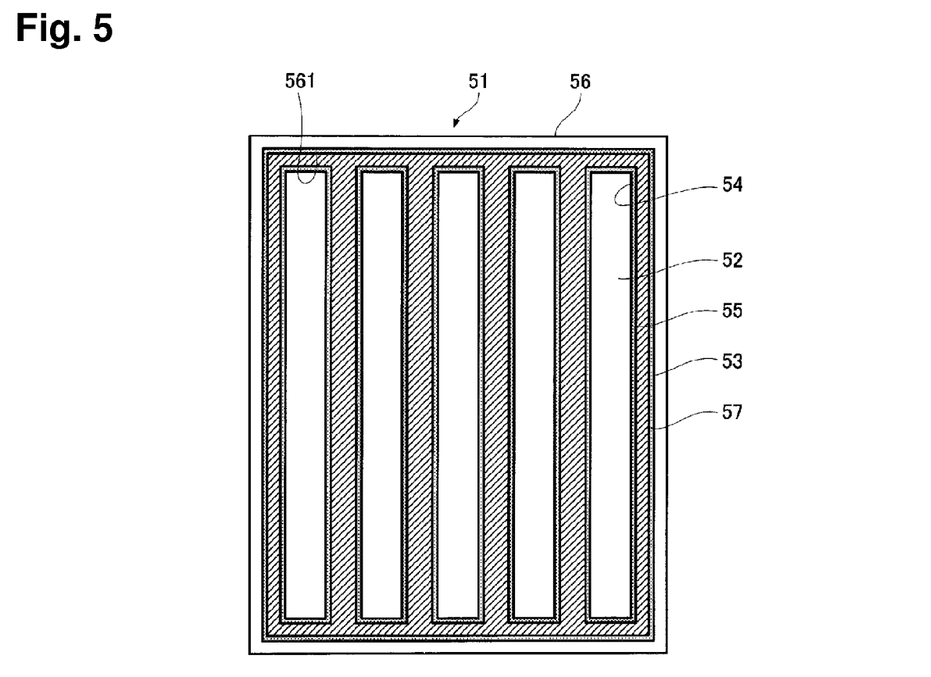
FIG. 5 A cross-sectional view showing the membrane module according to the embodiment.

As shown in FIG. 5, a membrane element holder 53 has a plurality of slits 54, into which the sides of respective membrane elements 52 are inserted. In each slit 54, a filler 55, made of a sealing material such as a resin or the like, attaches and watertightly seals the membrane elements 52 with the membrane element holder 53. The filler 55 binds the membrane elements 52 with one another at the sides thereof.

Figure 1:
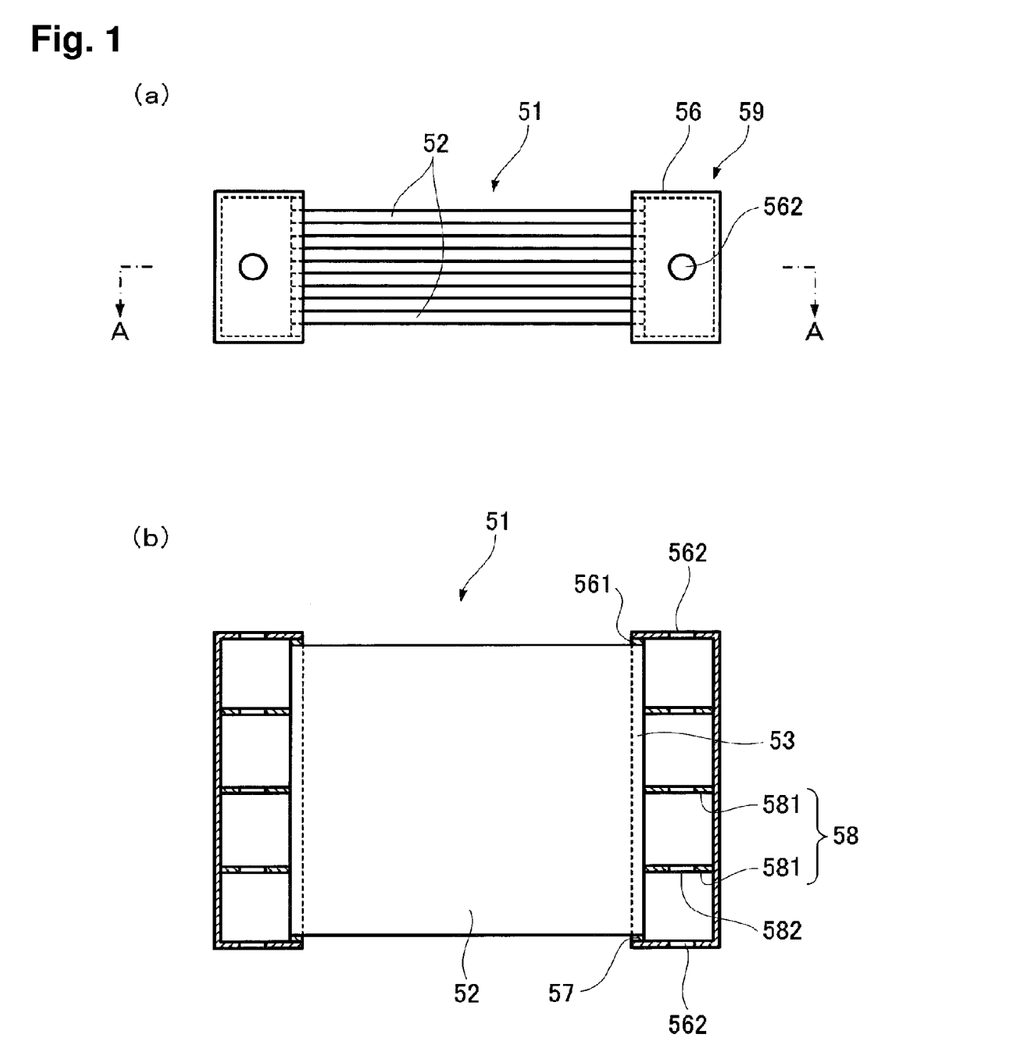
Figure 2:
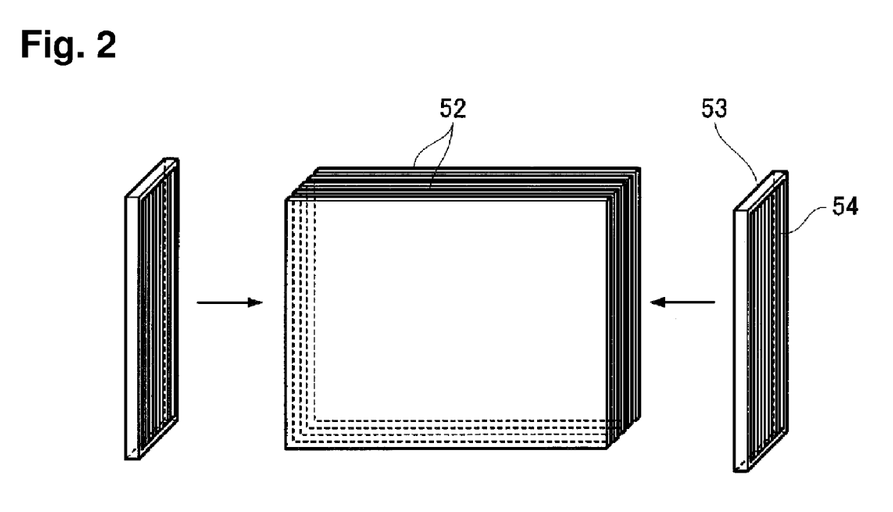
FIG. 2 An exploded perspective view showing the membrane module according to the embodiment.
Figure 3:
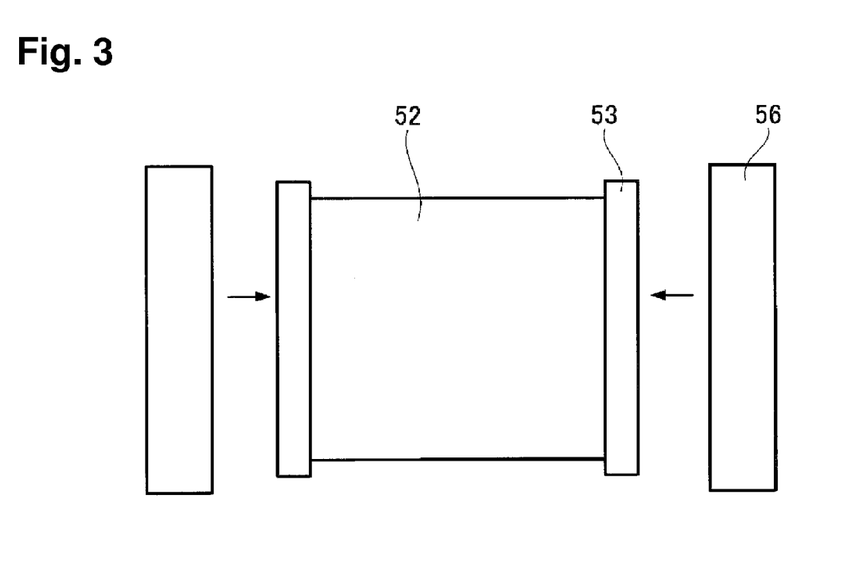
FIG. 3 A schematic view showing the membrane module according to the embodiment.
Figure 4:
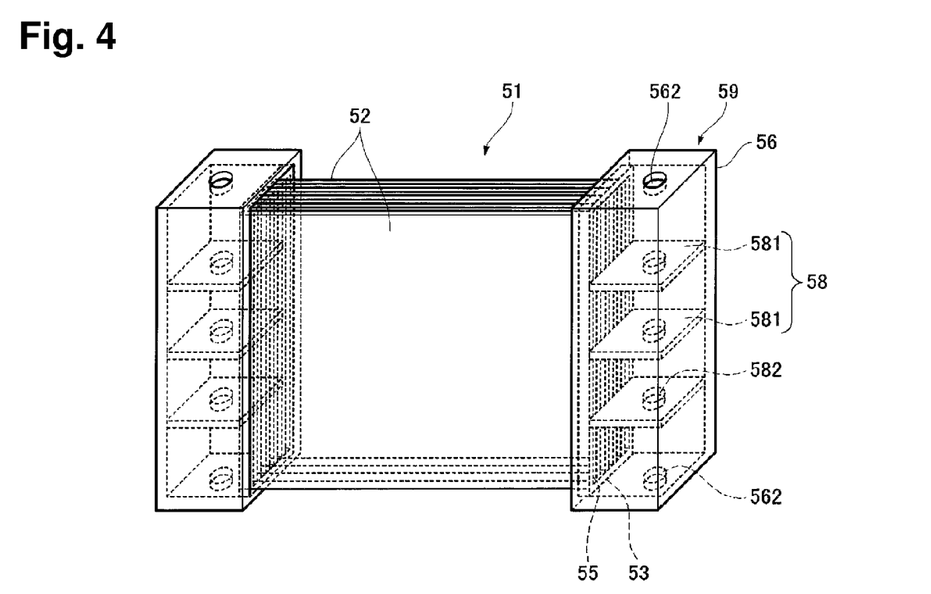
FIG. 4 A perspective view showing the membrane module according to the embodiment.

The membrane element holder 53 integrates a plurality of the membrane elements 52. As shown in FIG. 3, a collecting case member 56, with an opening 561 thereof, integrally holds the sides of the integrated membrane elements 52, and thereby forming a collecting case 59. A collecting space inside the collecting case member 56 communicates with the filtrate flow channels of the membrane elements 52. A sealer 57, acting as a sealing member, attaches and watertightly seals the collecting case member 56 with the membrane element holder 53. The sealer 57 may be made of a resin of the same material as that of the filler 55, or may use a rubber or the like.

A stopper 58 is provided inside the collecting case member 56. In the present embodiment, the stopper 58 is configured with a plurality of plates 581. The plurality of plates 581 are arranged in a vertical direction having a predetermined distance from one another, and each of the plates 581 is placed so as to be perpendicular to the membrane elements 52. One side of each plate 581 abuts on the membrane element holder 53. The plates 581 are integrally formed with the collecting case member 56. Alternatively, the plates 581 may be formed as members separate from the collecting case member 56, and thereafter fixed to the collecting case member 56.

A communicating hole 582 is provided to each plate 581. Collecting outlets 562 are provided to upper and lower end surfaces of the collecting case member 56. The collecting outlets 562 act as connectors when a plurality of membrane modules 51 are provided in a stacked state. When a single membrane module 51 is used, either upper or lower surface collecting outlet 562 is closed with a plug or the like. Positions of the communicating holes 582 in the plates 581 may be same, a center herein, in all the plates 581 as shown in FIG. 7(a), or different, a center and a side herein, in the upper and lower plates 581 respectively as shown in FIG. 7(b). It is also possible to provide the communicating holes 582 at different positions, a center and a side herein, in the upper and lower plates 581 respectively, and also to form the communicating holes 582 in a semicircular shape as shown in FIG. 7(c).

Hereinafter, a function of the above-descried configuration will be described. There is a variety of methods for providing a driving pressure to each membrane element 52 of the membrane module 51. Herein, a vacuum pump is used to provide a suction pressure as a driving pressure to the membrane module 51 through the collecting outlet 562 in order to perform a vacuum filtration. It is also possible to use a hydraulic head in a tank as a driving pressure in order to perform a gravity filtration on water to be treated in the tank by use of each membrane element 52.

Filtrate that has been filtered through the filtration membranes 522 of the membrane elements 52 in application of the driving pressure, flows into the collecting space inside the collecting case member 56 through the filtrate flow channel between the filtration membrane 522 and the filtration plate 521. The filtrate having flowed in the collecting case member 56 of the membrane module 51 is led outside from the upper collecting outlet 562 as treated water. In a configuration in which the plurality of membrane modules 51 are connected, the filtrate that has flowed in the collecting case member 56 of the lower membrane module 51 flows in the collecting case member 56 of the upper membrane module 51 via the upper collecting outlet 562.

Meanwhile, an activated sludge mixed solution is provided in a cross-flow manner to the flow channels among the membrane elements 52 by an upward flow, and at the same time, a membrane surface of the respective membrane elements 52 is cleaned by aeration with the upward flow. Such an aeration cleaning inhibits decrease in separation function caused by fouling and prevents a malfunction of the membrane separation device.

During the filtration operation described above, a suction pressure is applied to the collecting case 59 as an internal pressure, and a hydraulic head of the surrounding water to be treated is applied as an external pressure. A force caused by the pressure difference between the inside and the outside of the collecting case 59 is applied to the membrane element holder 53, the filler 55, or the sealer 57, and thus pushes the membrane element holder 53, the filler 55, or the sealer 57 toward the internal side of the collecting case 59, that is, in a direction so as to reduce the volume of the collecting case 59.

In the present embodiment, however, each plate 581 of the stopper 58 is provided inside the collecting case 59 and abuts on the membrane element holder 53. Thus, each plate 581 of the stopper 58 receives the force caused by the pressure difference between the inside and the outside of the collecting case 59. Thereby, shifting of the membrane holder 53, further, shifting of the membrane elements 52 and the filler 55 can be prevented, and distortion and breakage of the membrane module 51 can be prevented. In addition, distance among membrane elements 52 from one another can be kept constant. Furthermore, fluid leaks can be prevented from occurring on the bonded surfaces between the membrane elements 52 and the filler 55, between the membrane element holder 53 and the filler 55, between the collecting case member 56 and the filler 55, and between the collecting case member 56 and the sealer 57.

Figure 8:
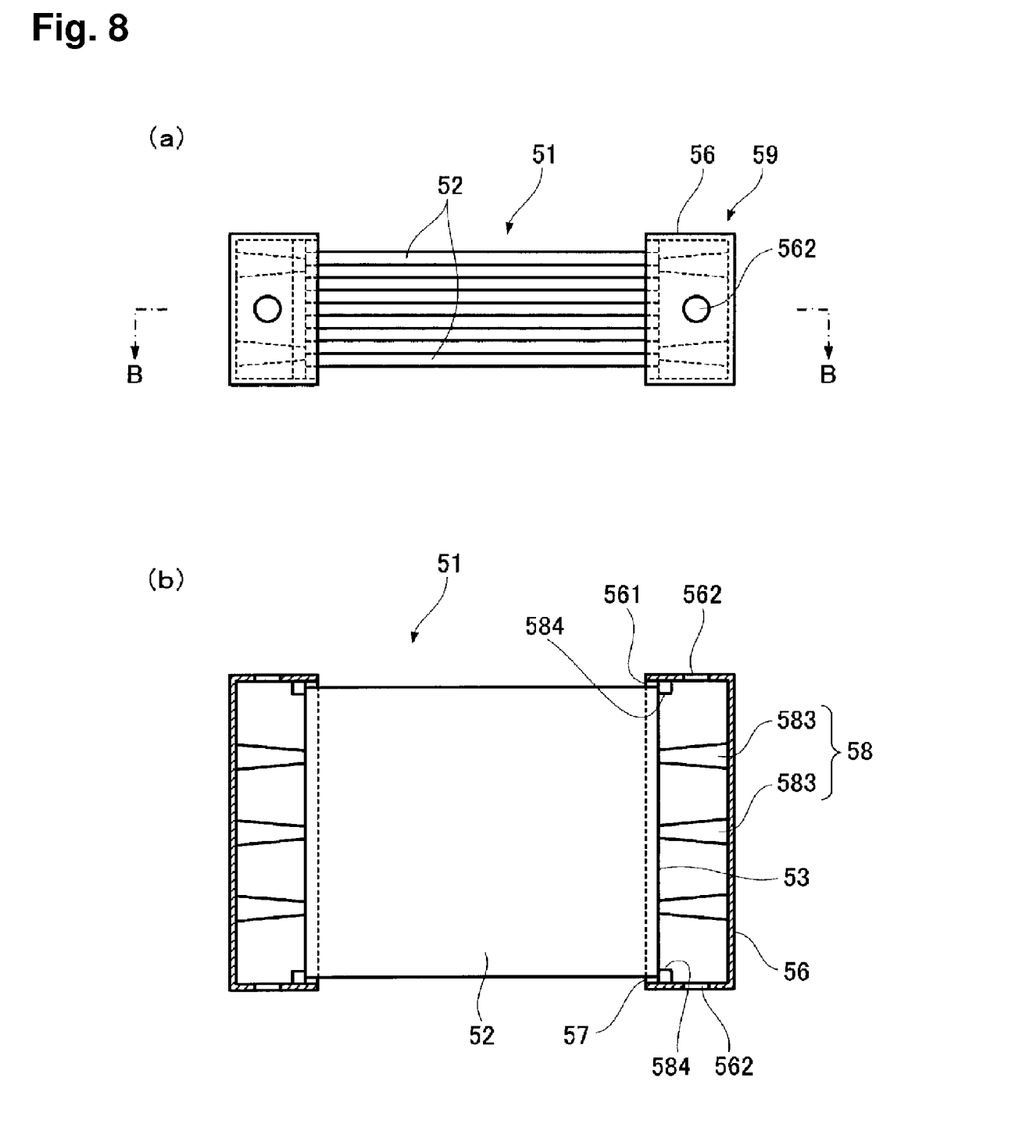
Figure 9:
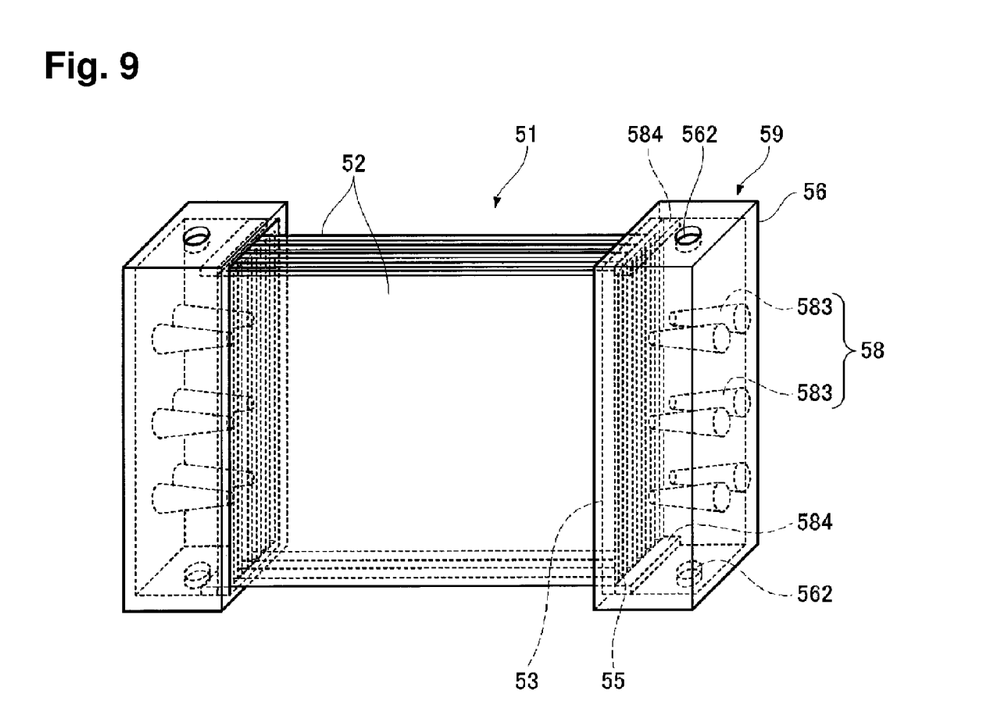
FIG. 9 A perspective view showing the membrane module according to the embodiment.
Figure 10:
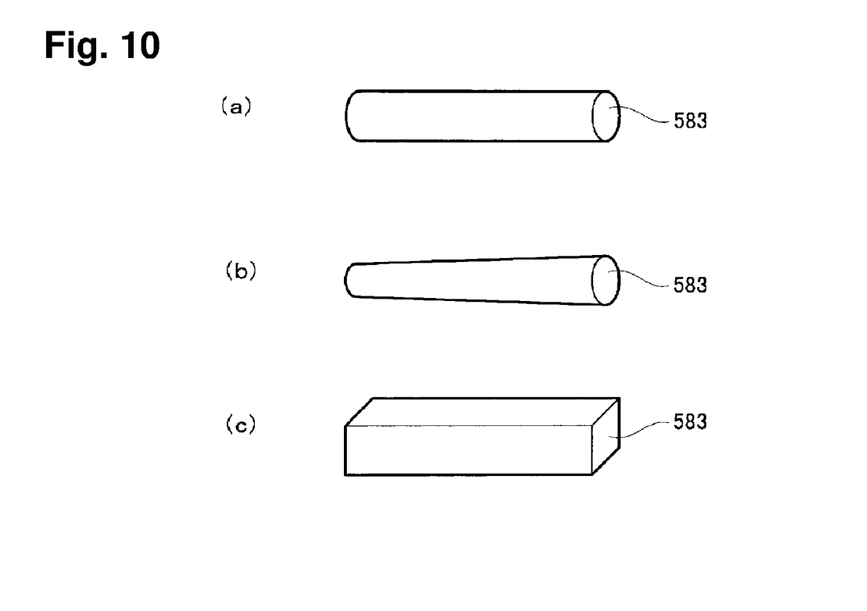
FIG. 10 A perspective view showing stoppers according to the embodiment.
Figure 11:
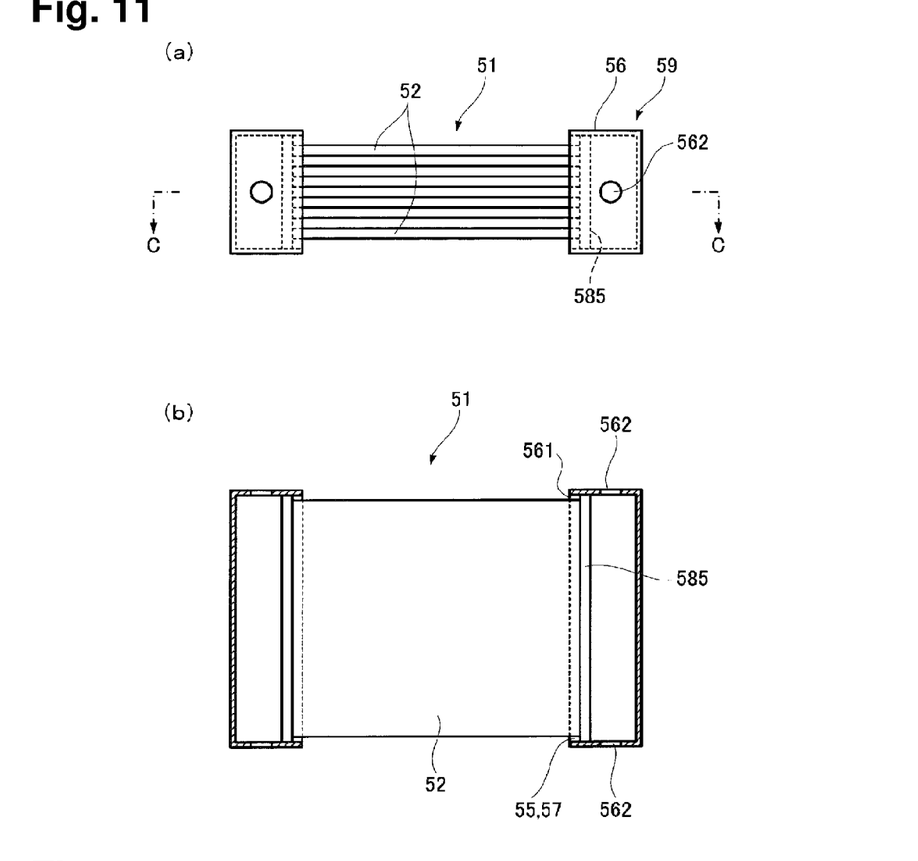
Figure 12:
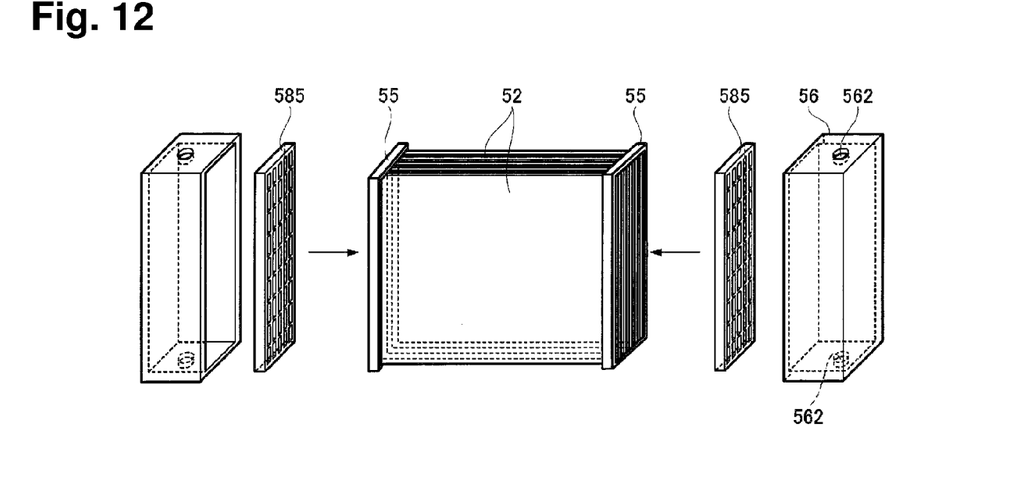
FIG. 12 An exploded perspective view showing the membrane module according to the embodiment.
Figure 13:
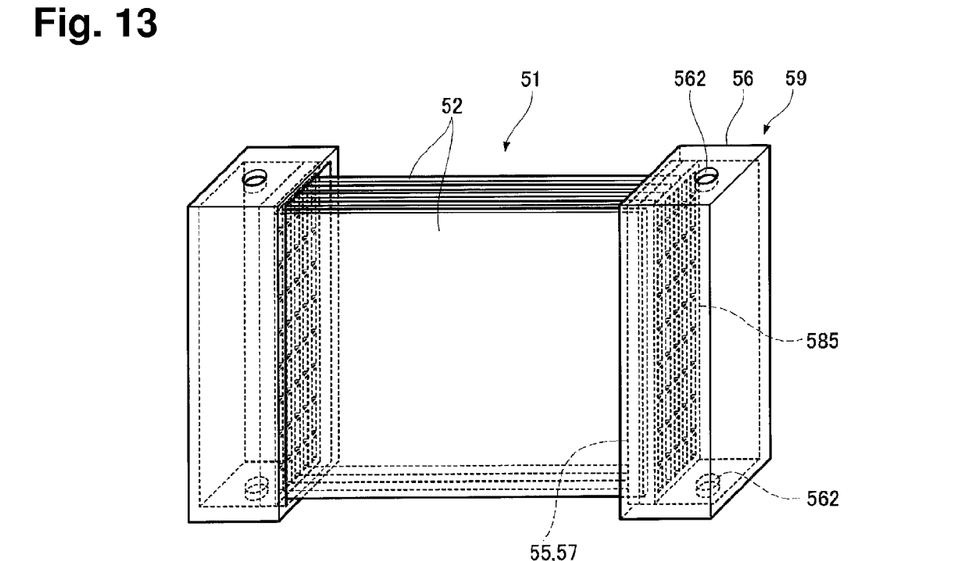
FIG. 13 A perspective view showing the membrane module according to the embodiment.

FIGS. 8 to 10 illustrate another embodiment of the present invention. Composition components having functions similar to the above embodiment are provided with the same numerical references, and illustration thereof is omitted. Herein, a plurality of rod-like members 583 is provided as the stopper 58. Further, steps 584 are provided to the internal upper surface and the internal lower surface of the collecting case member 56 as the stopper 58. The rod-like members 583 and the steps 584 are herein integrally formed with the collecting case member 56. Alternatively, it is also possible to form them as members separate from the collecting case member 56 and then fix them to the collecting case member 56. Further, only either one of the rod-like member 583 and the steps 584 may be provided.

Each of the plurality of rod-like members 583 abuts on a predetermined place of the membrane element holder 53. One side of each of the upper and lower steps 584 abuts on either upper end edge or lower end edge of the membrane element holder 53. The rod-like member 583 may have a cylindrical shape as shown in FIG. 10(*a*), a tapered shape as shown in FIG. 10(*b*), or a rectangular column shape as shown in FIG. 10(*c*).

In this configuration, the rod-like members 583 and the steps 584 of the stoppers 58 are provided inside the collecting case 59 and abut on the membrane element holder 53. The rod-like members 583 and the steps 584 of the stoppers 58 receive the force caused by the pressure difference between the inside and the outside of the collecting case 59. Thereby, shifting of the membrane element holder 53, further, shifting of the membrane elements 52 and the filler 55 can be prevented; distortion and breakage of the membrane module 51 can be prevented; and distance among membrane elements 52 from one another can be kept constant. Further, fluid leaks can be prevented from occurring on the bonded surfaces between the membrane elements 52 and the filler 55, between the membrane element holder 53 and the filler 55, between the collecting case member 56 and the filler 55, and between the collecting case member 56 and the sealer 57.

Figure 14:
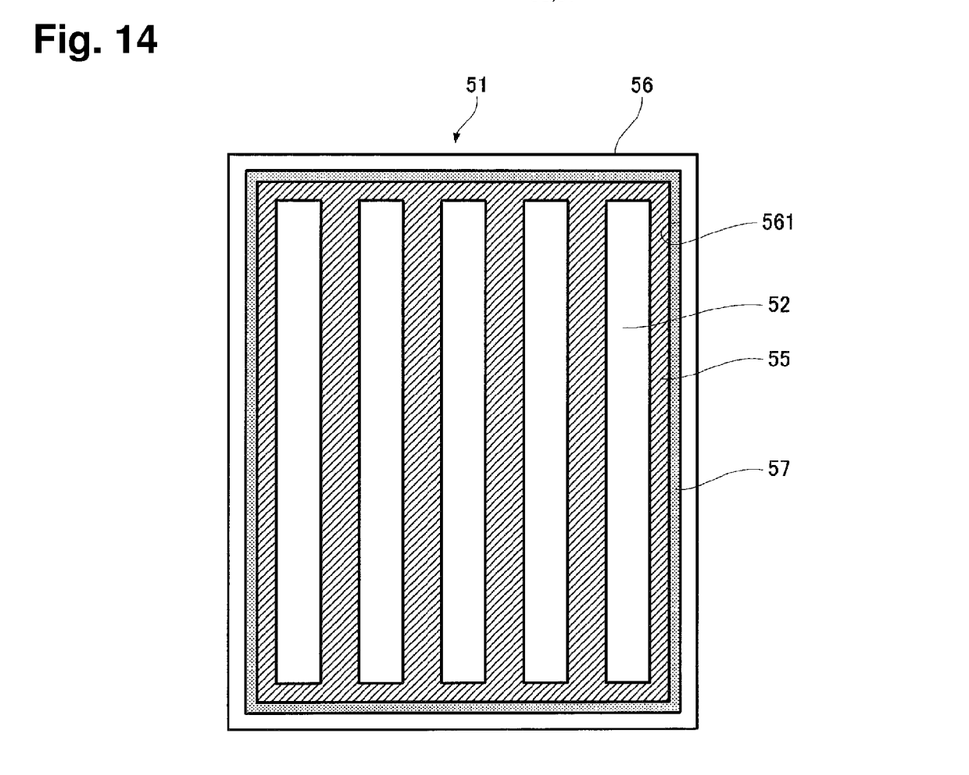
FIG. 14 A cross-sectional view showing the membrane module according to the embodiment.

FIGS. 11 to 15 illustrate another embodiment of the present invention. Composition components having functions similar to the above embodiments are provided with the same numerical references, and illustration thereof is omitted. Herein, as shown in FIG. 14, the plurality of membrane elements 52 are attached and watertightly sealed to one another at the sides thereof by use of the filler 55 made of a resin or the like, thereby the plurality of membrane elements 52 being integrated.

The collecting case member 56 integrally holds, with an opening 561 thereof, the sides of the plurality of membrane elements 52 integrated by the filler 55. The collecting space in the collecting case member 56 communicates with the filtrate flow channels of the membrane elements 52. The sealer 57, acting as a sealing member, attaches and watertightly seals the collecting case member 56 with the filler 55. The sealer 57 may be made of a resin of the same material as that of the filler 55, or may use a rubber or the like. In the present embodiment, the plurality of membrane elements 52 are integrated by the filler 55, and thereafter the collecting case member 56 and the filler 55 are attached and sealed by the sealer 57. Alternatively, it is also possible to integrally hold the plurality of membrane elements 52 by the filler 55, and at the same time, to attach and seal to the collecting case member 56.

In this embodiment, the collecting case 59 is formed by closing the opening 561 of the collecting case member 56 with the membrane element holder 53. Alternatively, the collecting case 59 may be formed by closing an opening of a box-shaped membrane element holder 53 with a plate-shaped collecting case member 56.

Figure 15:
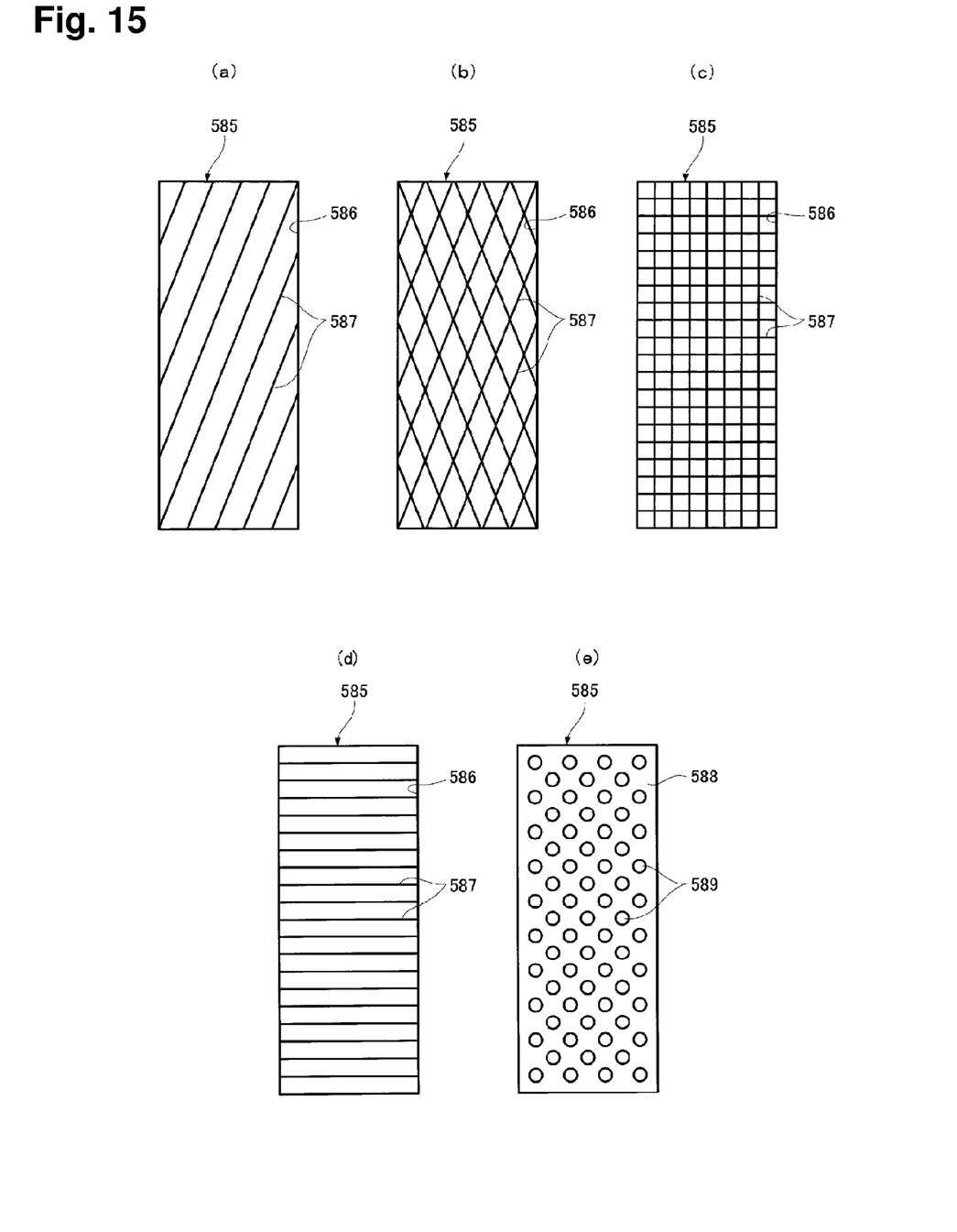
FIG. 15 A front view showing stoppers according to the embodiment.

The stopper 58 is provided inside the collecting case member 56 and is configured with a flat net 585 in this embodiment. The net 585 is fixed to the collecting case member 56 with an adhesive or the like, and abuts, with one main surface thereof, on the side end surfaces of all the membrane elements 52 housed in the collecting case 59. As shown in FIG. 15(*a*), the net 585 may be configured with a plurality of supporters 587 diagonally provided inside a frame 586 in parallel inclining at a predetermined angle with respect to the sides of the membrane elements 52. As shown in FIG. 15(*b*), the plurality of supporters 587 may be diagonally arranged in parallel where the diagonal lines intersecting one another and incline at a predetermined angle with respect to the sides of the membrane elements 52. As shown in FIG. 15(*c*), the plurality of supporters 587 may be arranged in a grid pattern intersecting at a right angle. As shown in FIG. 15(*d*), the plurality of supporters 587 may be arranged in a state where the parallel lines are perpendicular to the sides of the membrane elements 52. Further, as shown in FIG. 15(*e*), a plurality of holes 589 may be provided to a plate 588.

In this configuration, the net 585 of the stoppers 58 is provided inside the collecting case member 56 so as to abut on the side surfaces of all the membrane elements 52, and receives the force caused by the pressure difference between the inside and the outside of the collecting case 59. Thus, shifting of the membrane element holder 53, further, shifting of the membrane elements 52 and the filler 55 are prevented; distortion and breakage of the membrane module 51 are prevented; and a distance among membrane elements 52 from one another can be kept constant. Further, fluid leaks can be prevented from occurring on the bonded surfaces between the membrane elements 52 and the filler 55, and between the collecting case member 56 and the sealer 57.

Figure 16:
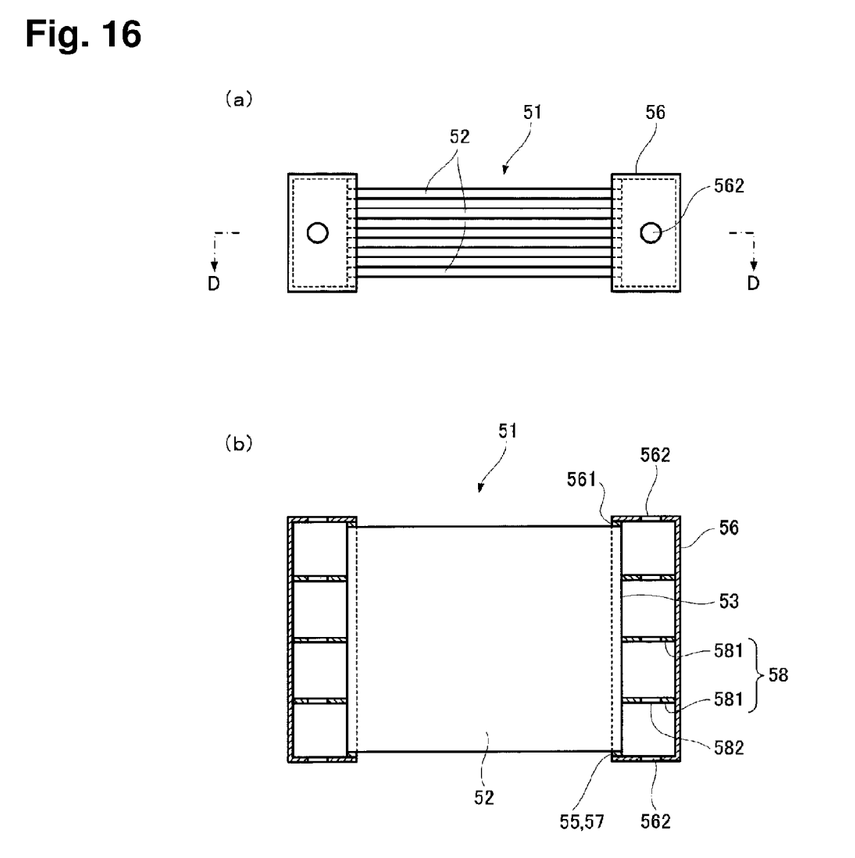
Figure 17:
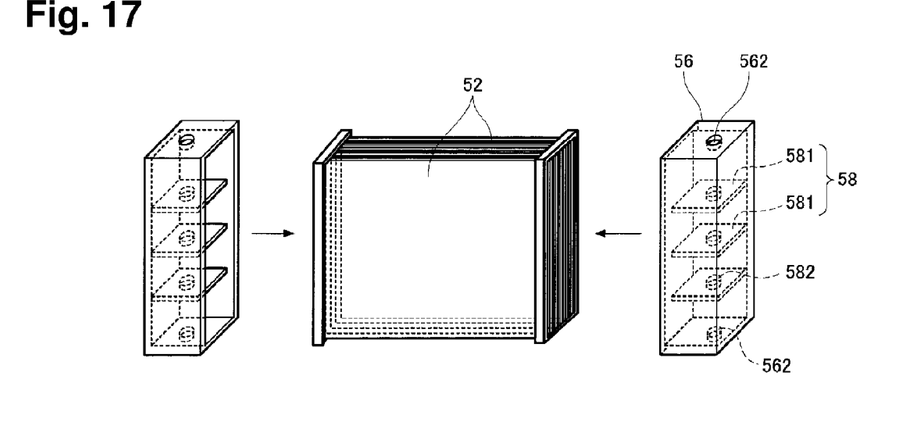
FIG. 17 An exploded perspective view showing the membrane module according to the embodiment.
Figure 18:
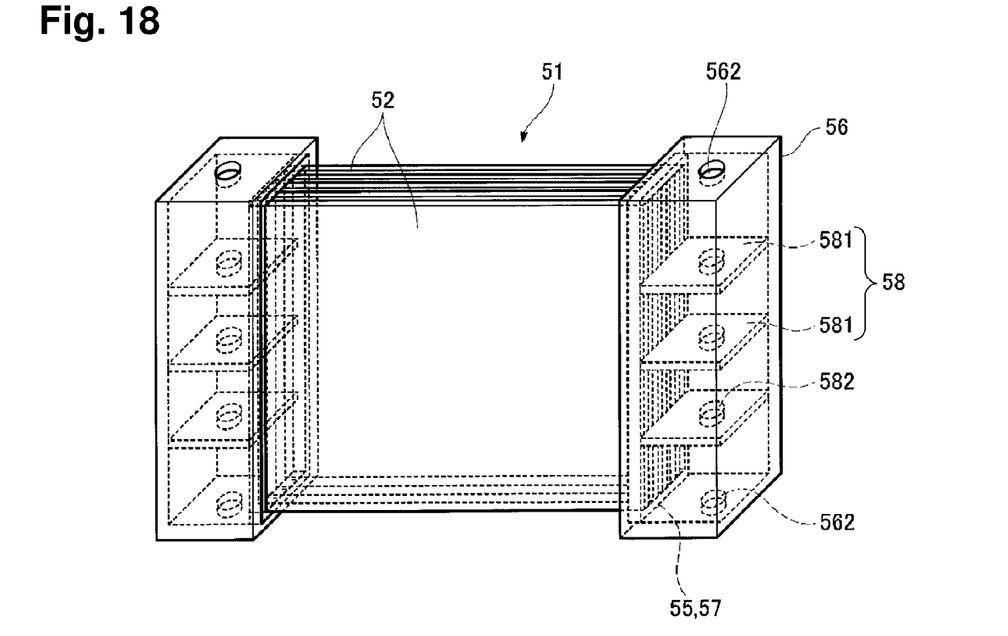
FIG. 18 A cross-sectional view showing the membrane module according to the embodiment.

FIGS. 16 to 18 illustrate another embodiment of the present invention. Composition components having functions similar to the above embodiments are provided with the same numerical references, and illustration thereof is omitted. Herein, the sides of the plurality of membrane elements 52 integrated by the filler 55 are integrally held by the collecting case member 56 with the opening 561 thereof. The collecting space inside the collecting case 59 communicates with the filtrate flow channels of the membrane elements 52. The sealer 57, acting as a sealing member, attaches and watertightly seals the collecting case member 56 with the filler 55. The sealer 57 may be made of the same material as that of the filler 55, or may use a rubber or the like.

The stopper 58 is provided inside the collecting case member 56, and is configured with a plurality of plates 581 in this embodiment. The plurality of plates 581 are vertically provided having a predetermined distance from one another and placed in a perpendicular direction with respect to the membrane elements 52. One side of each plate 581 abuts on the side surfaces of all the membrane elements 52 housed in the collecting case 59. The plates 581 are integrally formed with the collecting case member 56. Alternatively, the plates 581 may be formed as members separate from the collecting case member 56 and thereafter fixed to the collecting case member 56.

Figure 19:
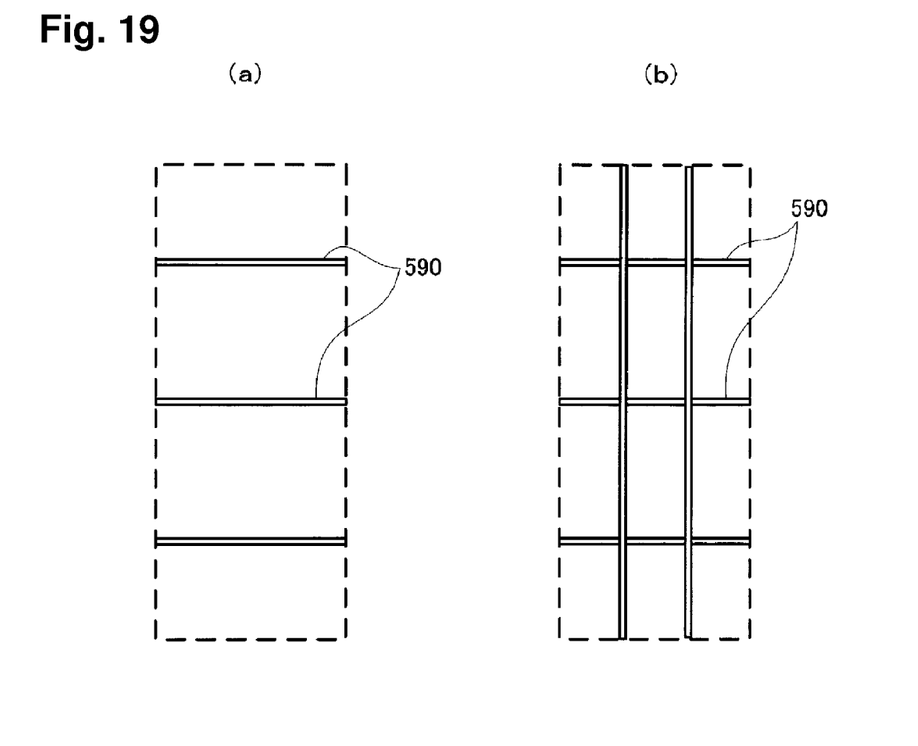
FIG. 19 A front view showing stoppers according to another embodiment.

As shown in FIG. 19, the stoppers 58 may be configured with a plurality of bars 590 that are directly attached to the collecting case member 56 and arranged in parallel while being perpendicular with respect to the sides of the membrane elements 52. Further, the bars 590 may be arranged in a grid pattern intersecting at a right angle.

In each of the above-descried embodiments, the membrane elements 52 and the collecting case 59 are attached and watertightly sealed therebetween by the filler 55. However, when the filtration plate 521 of the membrane element 52 and the membrane element holder 53 of the collecting case 59 are made of a resin, the membrane element 52 and the collecting case 59 may be directly bonded at the slits 54 of the membrane element holder 53 by use of thermal fusion bonding or ultrasonic fusion bonding. In this case, it is preferable that the filtration plate 521 of the membrane element 52 have a hollow space to be a filtrate flow channel, that a flow section is provided on the front and back main surfaces of the filtration plate 521 so as to communicate with the hollow space, and that the filtration plate 521 is bonded to the membrane element holder 53.

In each of the above-described embodiments, the stopper 58 may abut not only on the membrane element holder 53 but also on the side end surfaces of the membrane elements 52, as long as the stopper 58 abuts on at least either one of the side end surfaces of the membrane elements 52 and the membrane element holder 53. Further, one stopper 58 may abut on the side end surfaces of all the membrane elements 52, or one of the plurality of the stoppers 58 may abut on the side end surface of each membrane element 52.

The invention claimed is:

1. A membrane separation device comprising:
   a plurality of flat type membrane elements that are arranged in parallel to one another and form flow channels for a solution to be treated therebetween, the membrane elements having filtrate flow channels formed therethrough; and
   a collecting case having a collecting space communicating with the filtrate flow channels of the membrane elements, the collecting case comprising:
      a membrane element holder having a plurality of silts, into which a respective side end of each of the membrane elements is inserted, wherein the collecting case, with an opening thereof, integrally holds the side end of each of the membrane elements; and
   a stopper provided in the collecting space of the collecting case, the stopper abutting on at least one of the side end of the membrane elements and the membrane element holder.

2. A membrane separation device comprising:
   a plurality of flat type membrane elements that are arranged in parallel to one another and form flow channels for a solution to be treated therebetween, the membrane elements having filtrate flow channels formed therethrough;
   a filler that attaches and watertightly seals between side portions of adjacent ones of the membrane elements so as to integrate the plurality of membrane elements as a whole;
   a collecting case that integrally holds the side ends of the plurality of membrane elements through the filler, the collecting case having a collecting space, a side end of each of the membrane elements being exposed in the collecting space via the filler such that the filtrate flow channels of the membrane elements communicate with the collecting space; and
   a stopper provided in the collecting space of the collecting case, the stopper abutting on the side ends of the membrane elements.

3. The membrane separation device according to claim 1, wherein an entire side end of each of the membrane elements is exposed in the collecting space such that the filtrate flow channel of each of the membrane elements is in communication with the collecting space through the entire side end.

4. The membrane separation device according to claim 2, wherein an entire side end of each of the membrane elements is exposed in the collecting space such that the filtrate flow channel of each of the membrane elements is in communication with the collecting space through the entire side end.

5. The membrane separation device according to claim 1, wherein the stopper includes a plurality of plates or a plurality of rod-like members.

6. The membrane separation device according to claim 2, wherein the stopper includes a plurality of plates or a plurality of rod-like members.

* * * * *